June 20, 1967     L. B. CLOUGHERTY ET AL     3,326,825
BUTADIENE-ACRYLONITRILE POLYMER-WATER SOLUBLE
PHENOL FORMALDEHYDE RESIN-WATER INSOLUBLE
PHENOL FORMALDEHYDE RESIN-WATER
BASED ADHESIVE
Filed June 11, 1963

INVENTORS
LEO B. CLOUGHERTY
JOHN KERAMEDJIAN
AND JEROME NICKRAND

BY Harness and Harris
ATTORNEYS.

3,326,825
BUTADIENE-ACRYLONITRILE POLYMER-WATER SOLUBLE PHENOLFORMALDEHYDE RESIN-WATER INSOLUBLE PHENOLFORMALDEHYDE RESIN-WATER BASED ADHESIVE
Leo B. Clougherty, Birmingham, Mich., John Keramedjian, Schenectady, N.Y., and Jerome Nickrand, Warren, Mich., assignors to Chrysler Corporation, Highland Park, Mich., a corporation of Delaware
Filed June 11, 1963, Ser. No. 288,856
8 Claims. (Cl. 260—14)

This application is a continuation-in-part of application Ser. No. 53,561, filed Sept. 1, 1960 and now abandoned.

This invention concerns water based adhesives and in particular adhesives having high tensile strength at elevated temperatures while possessing considerable flexibility.

Figure 2:
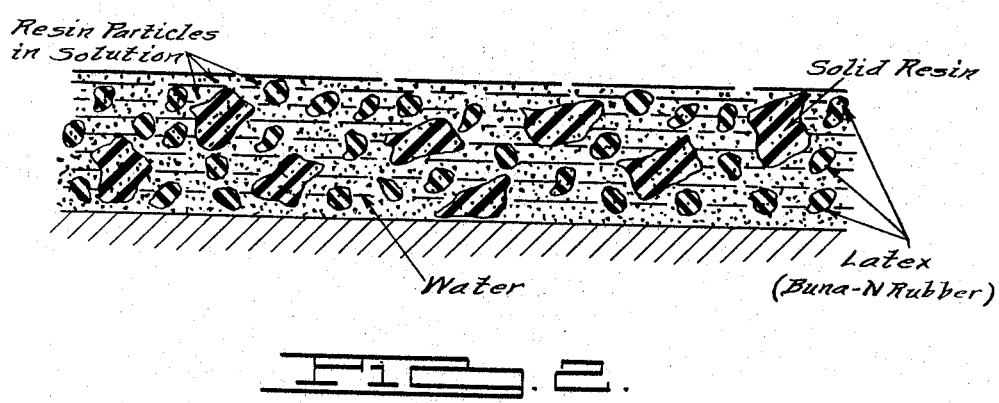

The general composition of the present adhesive is a Buna-N latex (a water dispersed Buna-N polymer sometimes referred to as a water emulsion of Buna-N), a water soluble phenolic resin preferably in liquid form, a water insoluble phenolic resin in particulate form, and preferably a thickening agent to help retain the insoluble resin particles in suspension and to control viscosity of the composition. The presence of the water soluble phenolic resin is a critical feature of this invention and is necessitated by the fact that a Buna-N latex and powdered insoluble resin, while providing a relatively good coherent film for certain applications cannot present sufficient phenolic resin at the bonding interface to bond two structural elements together with a sufficient bond strength to allow the resultant bonded structure to be used in applications subjected to substantial shear loads, for example, of 1000 p.s.i. and greater and elevated temperatures of up to about 500° F. We have found that the water soluble phenolic resin tends to pervade the entire system and presents a substantial phenolic resin interface with some latex in minor amount to the structures to be bonded as distinguished from a system where the soluble resin is not present and where the latex surrounds the insoluble resin and presents only a substantial latex interface. This explanation of the function of the water soluble resin is depicted in FIGURE 2 of the drawing.

A principal object, therefore, of this invention is to provide a water insoluble powdered phenolic resin and latex system with a water soluble resin ingredient to impart adhesive characteristics to the system.

A further object of this invention is to utilize the above stated object system in such applications as securing brake linings to their shoes wherein these linings are to be subject to the relatively high temperatures caused during braking.

Figure 1:
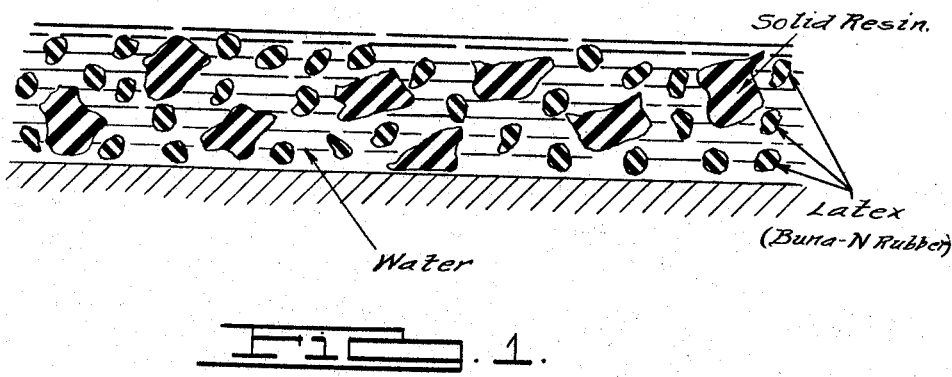

Further objects and advantages of the present invention will become apparent from the following description and drawings wherein:

FIGURE 1 represents a latex and water insoluble phenolic resin powder adjacent surfaces to be bonded (expanded view), FIGURE 2 represents the system of FIGURE 1 provided with the water soluble phenolic resin (expanded view).

Referring to FIGURES 1 and 2 it is apparent that the water soluble phenolic resin in FIGURE 2 provides a predominantly, i.e. substantially continuous resinous interface adjacent the surfaces to be bonded while the interface in FIGURE 1 where the soluble resin is absent, presents a predominantly, i.e. substantially continuous latex interface to the surfaces to be bonded. This latex interface in FIGURE 1 does not allow a good bond to structural elements, particularly at temperatures above about 150° F. One reason for this is that the average size of the insoluble resin particles and the rubber particles in FIGURE 1 are quite large 1,000,000 and 1200 Angstroms respectively and hence, the interface is predominantly of rubber particles which do not provide good adhesion when cured and which adhesion deteriorates at temperatures above 150° F. Although a resin-latex system as in FIGURE 1 is usable in applications where good adhesion is not essential and elevated temperatures are not anticipated it cannot be usefully applied to brake linings and similar applications where elevated temperatures sometimes as high as 300 to 400° F. would completely destroy any tendency of such a system to adhesively secure the two structural elements together because of the very small amount of resin actually present at the bonding interfaces.

In the system of FIGURE 2, the water soluble resin particles are quite small, in the order of 30 Angstroms average size, as compared to the particles of insoluble resin and rubber and cover at least as much surface area at the interface as do the rubber particles of the latex. In fact the water soluble resin particles predominantly cover the interface. Upon curing, the soluble resin and the insoluble resin become fused with the rubber and with each other. Since the soluble resin has already created a bond at the interface there is not only excellent adhesion with the structures to which the system is applied but there is also a fairly continuous coherent resin-rubber matrix extending throughout the system to which the rubber imparts flexibility. That the resultant bond has excellent adhesion is indicated by the test data shown herein. Moreover, the system provides excellent flexibility characteristics for absorbing shock.

Another feature of the resin-rubber system of FIGURE 2 is that it does not require the use of inflammable or otherwise injurious ingredients such as noxious flammable solvents normally found in brake lining adhesives.

The adhesive compositions of the invention productive of the system in FIGURE 2 and its novel features may contain the required resin and synthetic rubber components thereof in varying amounts but within the following general limits based upon 100 parts by weight solids content of the rubber and resin components:

Water soluble phenolic resin (solids) _____ 1 to 20 parts.
Synthetic rubber (solids) _____ 70 to 30 parts.
Water insoluble phenolic resin (solids) _____ Balance i.e. (69 to 10 parts).

Within this general range is a preferred range producing optimum adhesive and flexibility characteristics.

Water soluble phenolic resin (solids) _____ 2½ to 7½ parts.
Synthetic rubber (solids) _____ 60 to 40 parts.
Watter insoluble phenolic resin (solids) _____ 57½ to 32½ parts.

Of the foregoing components the synthetic rubber will be a carboxylic acid modified butadiene-acrylonitrile copolymer latex or stated otherwise a colloidal dispersion of a polymer containing the monomers butadiene and acrylonitrile and modified to contain carboxyl groupings on the polymer chain with water as the continuous phase. Specifically, it will be a polymer latex in the form of an acrylic acid modified butadiene-acrylonitrile polymer. These latices will preferably contain by weight between about 18 to 42% acrylonitrile, about 55 to 79% butadiene and between about 3 to 5% organic acid. In certain cases the polymer latex may be a terpolymer of the foregoing ingredients and in others, other monomers may be substituted in part for part of the butadiene monomer while still maintaining the amount of butadiene within the limits set forth.

Polymer latices of the type used in this invention are generally synthesized by copolymerizing butadiene, acrylonitrile, and acrylic acid in a water emulsion polymerization to yield the polymer latex. The monomers are mixed and emulsified with soap, for instance, a sodium alkyl sulfate soap and a catalyst such as potassium persulfate added to bring about a vinyl type polymerization.

The water soluble resin component of the composition should be a water soluble phenol-formaldehyde resole (one step phenolic) but may be in certain cases where the ultimate composition is to be used in a short period of time (48 hours) a water soluble urea-formaldehyde or water soluble melamine-formaldehyde resin or mixture of such resins.

The water soluble resins may be made in known manner, for example, by reacting a phenol or mixture of phenols with formaldehyde in water using an alkaline catalyst such as barium hydroxide until the desired viscosity is obtained and then cooling the mass and adding sufficient ammonium hydroxide or other bases to prevent precipitation.

The water insoluble resin should be either a resole (one step) or novolak (two step) phenol-formaldehyde resin or mixtures thereof.

The water insoluble resins may be prepared in known manner, for example, by reacting a phenol or mixture of phenols with formaldehyde in water using an alkaline catalyst such as barium hydroxide and continuing the reaction until a desired gel time is reached where the resin is in a water insoluble but still fusible state.

Where the water insoluble resin is a novolak resin it may, for example, be prepared by reacting a phenol or mixture of phenols with formaldehyde in the presence of an acid catalyst such as oxalic acid until a water insoluble fusible polymer is produced.

The water insoluble resins formed as aforesaid (resole or novolak) are dried and pulverized to a fine state, for example, to pass a No. 325 mesh screen and are used in the adhesive composition of the invention in this powdered state with or without a catalyst such as hexamethylenetetramine.

The adhesive compositions of the invention composed of the foregoing essential ingredients will in all cases contain water in amount adequate to maintain the stability of the latex. Such a condition is found to exist where the amount of water by weight is at least that of the total resin and rubber solids by weight. It has been found that when the proportion of resin-rubber solids by weight exceeds about 60% by weight of the aqueous resin-rubber system, the latex will coagulate in less than 48 hours. When the proportion of resin-rubber solids to water is below about 40%, the system will be completely stable. We prefer that the resin-rubber solids content of the resin-rubber-water system be in the order of 25% to 40% by weight. Greater amounts of water may be present but will merely serve to reduce the amount of adhesive contained in a film or coating layer of given thickness.

We have noted after actual test that when the amount of water soluble resin (solids) exceeds by weight about 20 parts as in the foregoing general formulation, the latex emulsion will be broken and the resultant gelatinous mass will be difficult to utilize. Moreover, a total resin content (solids) in 100 parts of the overall composition (solids) of less than 30 parts by weight will produce an adhesive composition with very low cohesive strength, inadequate for bonding such structures as brake linings. Moreover, a total resin content (solids) of more than the prescribed 70 parts weight above indicated will render the composition too rigid and materially detract from the effectiveness of the latex in the adhesive system.

In addition to the foregoing essential ingredients the adhesive composition of the invention may optionally include natural and synthetic thickeners such as bentonite clay, sodium alginate, fuller's earth, carboxymethyl cellulose, methyl cellulose, hydroxyethyl cellulose, ammonium caseinate, polyvinyl acetate. These may be used in amount sufficient to give the above compositions of the invention the desired Brookfield viscosity, preferably between about 10,000 to 30,000 centerpoises. Also, rubber curing agents such as zinc oxide, sodium aluminate, and sulfur may be included in the composition in amount between about 1 to 5 parts by weight per 100 parts by weight of latex solids.

In preparing the adhesive compositions of our invention we mix the water insoluble phenolic resin preferably in the form of a fine powder in water. If a thickener is used, the latter is first dissolved or dispersed in water and the powdered resin then added and mixed therewith to form a uniform aqueous mixture. To this mixture is then added the synthetic rubber latex with gentle stirring such that the resin-water mixture is distributed uniformly in the water phase of the colloidal rubber dispersion. Sufficient water will be present as previously described to avoid coagulation of the latex. The water soluble resin is then added with gentle stirring this resin being dissolved in or further diluted in the water phase of the dispersion. In no case is any extraneous heat required when combining the above components. The composition is now a combination aqueous dispersion (of synthetic rubber) a suspension (of the water insoluble resin) in the liquid phase of the colloidal dispersion and a solution (of the water soluble resin) in said liquid phase. To this composition may now be added any curing agents for the synthetic rubber.

The adhesive composition may be packaged and stored for prolonged periods of time, even as long as two years, without deterioration. It may be applied to adherends in any of the conventional modes of application, for example, dipping, spraying, extruding, brushing, roller coating, or trowelling depending upon the viscosity of the composition. After the composition is applied to one or both of the adherends, they are brought together and the composition cured, preferably with heat and pressure. A typical example is a pressure of 100 p.s.i. at a temperature of 350° F. The composition has many of the handling characteristics of rubber base wall paints in that it is not tacky in handling and is readily washed off with water prior to drying. The composition may be applied to an adherend prior to use and drys to a non tacky film or layer. It does not become tacky until heated above ambient temperatures, i.e. the melting or fusing point of the resin ingredients. Hence, coated parts may be packaged or stored in groups without adhering to each other.

Upon curing the composition provides extremely high adhesive strength, both at room temperature and elevated temperatures, for example, up to 500° F. It has adequate resistance to moisture and solvents for most applications.

The following are typical examples of compositions prepared in accordance with the teachings of our invention and which are provided to indicate more fully the nature and capabilities of the novel resin-rubber adhesive system of FIGURE 2 of our invention. They are not set forth by way of limitation:

EXAMPLE I

|  | Gross Weight, gms. | Weight of Solids, gms. | Weight of Water, gms. |
|---|---|---|---|
| No. 1571 Hycar latex | 100 | 40 | 60 |
| R-116 Water insoluble phenolic resin | 37 | 37 | 0 |
| V-172 Water soluble phenolic resin | 7.5 | 7.75 | 3.75 |
| 3.3% Aqueous carboxymethyl-cellulose solution | 60 | 2 | 58 |

In the above example Hycar No. 1571 is a colloidal dispersion of a butadiene-acrylonitrile copolymer modified to contain acrylic acid groupings on the polymer chain with water as the continuous phase. It has a pH of about 8.5, an average particle size of 1200 Angstroms, and an average viscosity of 12 centerpoises as measured by a Brookfield LVF #1 spindle at 60 r.p.m. It contains about 40% solids and the ratio of butadiene to acrylonitrile is approximately 60:40.

R-116 is a water insoluble phenolic resin in dry powdered form. It is a cresylic acid modified phenol formaldehyde novolak (two step) resin ground with 9 parts by weight of hexamethylenetetramine catalyst. The powder particles are of a size passing a 325 mesh screen.

V-172 is a water soluble phenolic resin which is an aqueous alkaline solution of a cresol modified phenol formaldheyde resole (one step) resin.

The carboxymethylcellulose is obtainable as a powder under the name CMC cellulose gum type 70 high.

The composition was prepared by incorporating the thickener and R-116 resin together then mixing this suspension with the 1571 rubber dispersion and then adding the V-172 soluble resin all as described above.

The adhesive strength of the composition of this example was tested at ambient temperature and at 400° F. by applying a layer of 0.010 thickness of the composition along one long edge portion of a face of etched aluminum panels 4″ x 6″ x 1/16″ thick and the panels brought together to form a lap joint along the long side of 1/2″ width all in accordance with ASTM lap shear test standard No. D-1002. The adhesive was cured at a temperature of 370° F. for thirty minutes under a pressure of 200 p.s.i. The bonded panels were then cooled to ambient temperature and sawed into one inch wide coupons and tested in shear in accordance with the ASTM standard in an Olson tensile testing machine at a separation rate of 0.05 inch per minute. The strength in shear obtained for three coupons tested at ambient temperature and three tested at 400° F. were as follows:

*Shear values in p.s.i.*

| Coupon No. | At Ambient Temperature | At 400° F.[1] |
|---|---|---|
| 1 | 3,050 | |
| 2 | 2,800 | |
| 3 | 2,900 | |
| 4 | | 350 |
| 5 | | 200 |
| 6 | | 150 |

EXAMPLE II

A composition was prepared in accordance with Example I but omitting the soluble resin V-172. Test coupons were prepared as described in Example I with the following results:

*Shear values in p.s.i.*

| Coupon No. | At Ambient Temperature | At 400° F.[1] |
|---|---|---|
| 1 | 0 | |
| 2 | 0 | |
| 3 | 300 | |
| 4 | 240 | |
| 5 | 200 | |
| 6 | 0 | |

[1] Not tested because of results at ambient temperature.

This test clearly shows that a composition omitting the essential water soluble constituent of the invention has little or no adhesive strength after curing.

EXAMPLE III

A composition was prepared as in Example I using the following ingredients:

| | Gross Weight, gms. | Weight of Solids, gms. | Weight of Water, gms. |
|---|---|---|---|
| No. 1571 Hycar latex | 170 | 68 | 102 |
| V-172 water soluble phenolic resin | 60 | 30 | 30 |
| 3.3% aqueous carboxymethyl-cellulose solution | 60 | 2 | 58 |

Test coupons were immediately prepared as described in Example I and tested with the following results:

*Shear values in p.s.i.*

Coupon No.: At ambient temperature
1 ---------------------------------------- 1370
2 ---------------------------------------- 1490
3 ---------------------------------------- 1470

This test shows that if the water insoluble resin is entirely omitted and the water soluble resin content is in excess of the 20% by weight based on solids while still using latex in amount within the required range that the shear strength obtained is substantially below that for the composition of Example I. Moreover, it was necessary to prepare and cure the test samples immediatrely after preparation of the composition as the latex was not stable in this combination and coagulated within 20 hours after composition was prepared.

EXAMPLE IV

A composition was prepared as in Example I using the following ingredients:

| | Gross Weight, gms. | Weight of Solids, gms. | Weight of Water, gms. |
|---|---|---|---|
| No. 1571 Hycar latex | 70 | 28 | 42 |
| V-172 water soluble phenolic resin | 140 | 70 | 70 |
| 3.3% aqueous carboxymethyl-cellulose solution | 60 | 2 | 58 |

It was impossible to retain a stable latex dispersion with this composition. The latex coagulated immediately that the water soluble resin was added. Test coupons were nevertheless immediately prepared as described in Example I using the resulting composition with the following results:

*Shear values in p.s.i.*

Coupon No.: At ambient temperature
1 ---------------------------------------- 900
2 ---------------------------------------- 630
3 ---------------------------------------- 230

This example illustrates that a stable composition is not possible when the water insoluble resin is omitted and the amount of water soluble resin is in excess of 20% by weight based on solids while still using latex within the allowable limits. Also, that the shear strength after curing was very low.

EXAMPLE V

A composition was prepared in accordance with Example I after which there was added thereto with stirring the following rubber curing agents:

| | Gross Weight | Weight of Solids | Weight of Water |
|---|---|---|---|
| 4 gms. of a dispersion of zinc oxide in water (50% solids) | 4 | 2 | 2 |
| 1.5 gms. of a dispersion of sulfur in water (66% solids) | 1.5 | 1 | 0.5 |

These may be used with good results in amounts of each of about 5% by weight (solids) of the rubber constituent (solids). They also may be used individually. Other known curing agents for rubber may also be used in a similar manner. Test coupons were prepared as described in Example I with the following results:

*Shear values in p.s.i.*

*Shear values in p.s.i.*

| Coupon No. | At Ambient Temperature | At 400° F.[1] |
|---|---|---|
| 1 | 3,080 | |
| 2 | 3,200 | |
| 3 | 3,110 | |
| 4 | | 950 |
| 5 | | 780 |
| 6 | | 920 |

The effect of the curing agents was to improve the shear strength at 400° F.

EXAMPLE VI

A composition was prepared as in Example I using the following ingredients:

| | Gross Weight, gms. | Weight of Solids, gms. | Weight of Water, gms. |
|---|---|---|---|
| No. 1572 Hycar latex (50% solids) | 120 | 60 | 60 |
| R-116 powdered water insoluble phenolic resin | 36 | 36 | |
| V-172 water soluble phenolic resin | 8 | 4 | 4 |
| 3.3% carboxymethylcellulose solution | 60 | 2 | 58 |

Hycar 1572 is a colloidal dispersion of a butadiene-acrylonitrile copolymer modified to contain acrylic acid groupings in the polymer chain with water as the continuous phase. The ratio of butadiene to acrylonitrile is approximately 67 to 33. It has a pH of 6.6 to 7.4, a Mooney viscosity of 80.

Test coupons were prepared as described in Example I and tested with the following results:

*Shear values in p.s.i.*

Coupon No.: At ambient temperature
1 _____ 3340
2 _____ 2850
3 _____ 3150

EXAMPLE VII

A composition was prepared in accordance with the steps of Example I using the following ingredients:

| | Gross Weight, gms. | Weight of Solids, gms. | Weight of Water, gms. |
|---|---|---|---|
| No. 1572 Hycar latex | 80 | 40 | 40 |
| R-116 powdered water insoluble phenolic resin | 40 | 40 | 0 |
| V-172 water soluble phenolic resin | 7.5 | 3.75 | 3.75 |
| Water | 60 | | 60 |

Test coupons were prepared as described in Example I and tested with the following results:

*Shear values in p.s.i.*

Coupon No.: At ambient temperature
1 _____ 2220
2 _____ 1960
3 _____ 2380

EXAMPLE VIII

A composition was prepared as follows using the procedures of Example I:

| | Gross Weight, gms. | Weight of Solids, gms. | Weight of Water, gms. |
|---|---|---|---|
| No. 1872 Hycar latex (40% solids) | 100 | 40 | 60 |
| R-116 powdered water insoluble resin | 37.5 | 37.5 | |
| V-172 water soluble phenolic resin | 7.5 | 3.75 | 3.75 |
| 3.3% aqueous carboxymethylcellulose solution | 60 | 2 | 58 |

Hycar 1872 is a low soap colloidal dispersion of a butadiene-acrylonitrile copolymer modified to contain acrylic acid groupings on the polymer chain with water as the continuous phase. It has a pH of between about 8.5 to 9.0, a Mooney viscosity of between 70 to 100 and contains 28 to 30% by weight of bound acrylonitrile.

Test coupons were prepared and tested as described in Example I with the following results:

*Shear values in p.s.i.*

Coupon No.: At ambient temperature
1 _____ 2020
2 _____ 2040
3 _____ 1850

EXAMPLE IX

A composition was prepared as in Example I using the following ingredients:

| | Gross Weight, gms. | Weight of Solids, gms. | Weight of Water, gms. |
|---|---|---|---|
| No. 1572 Hycar latex (50% solids) | 35 | 17.5 | 17.5 |
| R-116 water insoluble phenolic resin | 24 | 24 | |
| V-172 water soluble phenolic resin | 4.5 | 2.25 | 2.25 |
| 3.3% aqueous carboxymethyl-cellulose resin | 50 | 1.6 | 48.4 |

Test coupons were prepared as described in Example I and tested with the following results:

*Shear values in p.s.i.*

| Coupon No. | At Ambient Temp. | At 400° F. |
|---|---|---|
| 1 | 2,620 | |
| 2 | 2,550 | |
| 3 | 2,330 | |
| 4 | | 510 |
| 5 | | 480 |
| 6 | | 520 |

EXAMPLE X

A composition was prepared as follows using the procedures of Example I:

| | Gross Weight, gms. | Weight of Solids, gms. | Weight of Water, gms. |
|---|---|---|---|
| No. 1572 Hycar latex | 80 | 40 | 40 |
| R-116 powdered insoluble phenolic resin | 40 | 40 | |
| Durez 14798 (50% solids) water soluble phenolic resin | 7.5 | 4.875 | 2.615 |
| 2.5% carboxymethyl-cellulose solution | 75 | 1.9 | 73.1 |

Durez 14798 is a liquid, water soluble thermosetting one step phenol-formaldehyde resin having a pH of 6.8–7.2 and containing 65% solids. It has a viscosity of approximately 5000 centerpoise at 25° C.

Test coupons were prepared as described in Example I and tested with the following results:

*Shear values in p.s.i.*

| Coupon No.: | At ambient temperature |
|---|---|
| 1 | 3700 |
| 2 | 3840 |
| 3 | 3870 |

EXAMPLE XI

A composition was prepared as follows using the procedures of Example I:

| | Gross Weight, gms. | Weight of Solids, gms. | Weight of Water, gms. |
|---|---|---|---|
| No. 1570X36 Hycar latex (40% solids) | 112 | 44.8 | 67.2 |
| R-116 water insoluble resin | 44.8 | 44.8 | |
| V-172 water soluble phenolic resin | 7.5 | 3.75 | 3.75 |
| 66% dispersion of sulfur in water | 3.0 | 2.0 | 1.0 |
| 50% dispersion of zinc oxide | 1.0 | 0.5 | 0.5 |
| 3.3% aqueous carboxymethyl-cellulose solution | 60 | 2.5 | 58.0 |

No. 157x36 Hycar latex is a high water resistant colloidal dispersion of an acrylic acid modified copolymer of butadiene and acrylonitrile with water as the continuous phase. It has a pH of between 8.2 to 8.6, a Mooney viscosity of between 90 to 105 and contains between 18.5 to 20.5% by weight of bound in acrylonitrile.

Test coupons were prepared as described in Example I and tested with the following results:

*Shear values in p.s.i.*

| Coupon No. | At Ambient Temperature | At 400° F. |
|---|---|---|
| 1 | 2,550 | |
| 2 | 2,800 | |
| 3 | 2,920 | |
| 4 | | 560 |
| 5 | | 520 |
| 6 | | 250 |

This composition provides a particularly well balanced adhesive from the standpoint of viscosity (22000 centerpoises) stability, water resistance, and high strength over a wide temperature range (−50° F. to 500° F.).

EXAMPLE XII

A composition was prepared as follows using the procedures of Example I:

| | Gross Weight, gms. | Weight of Solids, gms. | Weight of Water, gms. |
|---|---|---|---|
| No. 1572 Hycar latex (50% solids) | 80 | 40 | 40 |
| R-116 powdered water insoluble phenolic resin | 40 | 40 | |
| "Urac" No. 110 water soluble urea-formaldehyde resin | 3.75 | 3.75 | |
| 2.5% carboxymethyl-cellulose solution | 92 | 2.3 | 89.7 |

"Urac" No. 110 is an unmodified powdered water soluble urea-formaldehyde resin.

Test coupons were prepared as described in Example I and tested with the following results:

*Shear values in p.s.i.*

| Coupon No.: | At ambient temperature |
|---|---|
| 1 | 2200 |
| 2 | 2600 |
| 3 | 2050 |

Example XIII

A composition was prepared as follows using the procedures of Example I.

| | Gross Weight, gms. | Weight of Solids, gms. | Weight of Water, gms. |
|---|---|---|---|
| No. 1572 Hycar latex (50% solids) | 40 | 20 | 20 |
| Durez No. 11078 powdered water insoluble phenolic resin | 20 | 20 | |
| V-172 water soluble phenolic resin | 4 | 2 | 2 |
| 2.25% aqueous carboxymethyl-solution | 45 | 1 | 44 |
| 66% dispersion of sulfur in water | 2.5 | 1.7 | 0.8 |

Durez. No. 11078 resin is a solid one step therosetting phenol-formaldehyde resin which is pulverized prior to use to pass a 200 mesh screen.

Test coupons were prepared as described in Example I and tested with the following results:

*Shear values in p.s.i.*

| Coupon No.: | At ambient temperature |
|---|---|
| 1 | 1680 |
| 2 | 1690 |
| 3 | 1760 |

Example XIV

A composition was prepared as follows using the procedures of Example I:

| | Gross Weight, gms. | Weight of Solids, gms. | Weight of Water, gms. |
|---|---|---|---|
| No. 1572 Hycar latex (50% solids) | 40 | 20 | 20 |
| R-116 powdered water insoluble phenolic resin | 20 | 20 | |
| Cymel resin No. 401 | 3.75 | 3.75 | |
| 2.5% carboxymethyl-cellulose solution | 46 | 1.1 | 44.9 |

Cymel resin No. 401 is a water soluble unmodified melamine-formaldehyde resin in powdered form.

Test coupons were prepared as described in Example I and tested with the following results:

*Shear values in p.s.i.*

| Coupon No.: | At ambient temperature |
|---|---|
| 1 | 1500 |
| 2 | 1300 |
| 3 | 1500 |

From the foregoing description of our invention it will be evident that we have provided new and novel water based adhesives by bonding adherends together, for example, brake linings to their metal shoes which adhesives provide high tensile strengths at ambient and elevated temperatures while retaining substantial flixibility.

It will be understood that various changes and modifications in the compositions and processing steps of the invention will suggest themselves to those skilled in the art without departing from the spirit and intent of our invention. All such changes, modifications, and equivalents as may come within the purview of the appended claims are therefore contemplated.

We claim:

1. A flowable latent adhesive compostion containing as essential ingredients an acrylic acid modified butadiene-acrylonitrile polymer comprising by weight between 55 to 69% butadiene, about 18 to 42% acrylonitrile, and about 3 to 5% acrylic acid, a water insoluble phenol-formaldehyde resin, a water soluble resin selected from the group consisting of phenol-formaldehyde, urea-formaldehyde and melamine-formaldehyde resins and mixtures thereof and water, said polymer being present as a colloidal dispersion in said water as the continuous phase, said water insoluble resin being suspended in said water and said water soluble resin being in solution in said water, said polymer constituting between about 70 to 30 parts by weight of the composition based on solids, said water soluble resin constituting between about 1 to 20 parts by weight of the composition based on solids, said water insoluble resin comprising the remaining solids of said composition and in amount between about 69 to 10 parts by weight of the composition based on solids and said water being in amount at least about 40% by weight of the total composition.

2. A flowable latent adhesive composition as claimed in claim 1 wherein said water soluble resin is a water soluble phenol-formaldehyde resin.

3. A flowable latent adhesive composition as claimed in claim 1 wherein said water soluble resin is a water soluble urea-formaldehyde resin and which composition may be packaged and stored for prolonged periods of time without substantial deterioration.

4. A flowable latent adhesive composition as claimed in claim 1 wherein said water soluble resin is a water soluble melamine-formaldehyde resin.

5. A flowable latent adhesive composition as claimed in claim 1 wherein said water soluble resin constitutes between about 2½ to 7½ parts by weight of the composition based on solids, said polymer constitutes between about 60 to 40 parts by weight of the composition based on solids and said water insoluble resin comprises the remaining solids of the composition and in amount between about 57½ to 32½ parts by weight of the composition based on solids.

6. A flowable latent adhesive composition as claimed in claim 1 wherein the composition includes water in amount to make the combined polymer and resin solids of the composition between about 25 to 40% by weight of the total composition.

7. A flowable latent adhesive composition as claimed in claim 1 including a thickener selected from the group consisting of natural and synthetic thickeners.

8. A flowable latent adhesive composition consisting essentially of about 40–50 parts by weight based on solids of an acrylic acid modified polymer of butadiene and acrylonitrile, about 40 to 50 parts by weight based on solids of water insoluble phenolic resin, about 3 to 5 parts by weight based on solids of water soluble phenolic resin, about 1 to 3 parts by weight based on solids of sulfur, about 0.2 to 1 part by weight based on solids of zinc oxide, about 1 to 4 parts by weight based on solids of carboxymethyl cellulose and about 80 to 130 parts by weight of water.

References Cited

UNITED STATES PATENTS

| 2,453,188 | 11/1948 | Blume | 106—36 |
| 2,871,213 | 1/1959 | Graulich et al. | 260—29.3 |
| 2,954,853 | 10/1960 | Maierson et al. | 188—234 |

FOREIGN PATENTS

| 201,005 | 2/1956 | Australia. |
| 461,522 | 11/1949 | Canada. |

OTHER REFERENCES

Delmonte: "The Technology of Adhesives," Reinhold Publishing Corp., 1947, p. 188, 189, 218 and 246.

WILLIAM H. SHORT, *Primary Examiner.*

J. NORRIS, E. M. WOODBERRY, *Assistant Examiners.*